W. BARBER.
BRAKE MECHANISM.
APPLICATION FILED FEB. 14, 1918.

1,430,349.

Patented Sept. 26, 1922.
3 SHEETS—SHEET 1.

Inventor
William Barber
by his atty Samuel _____

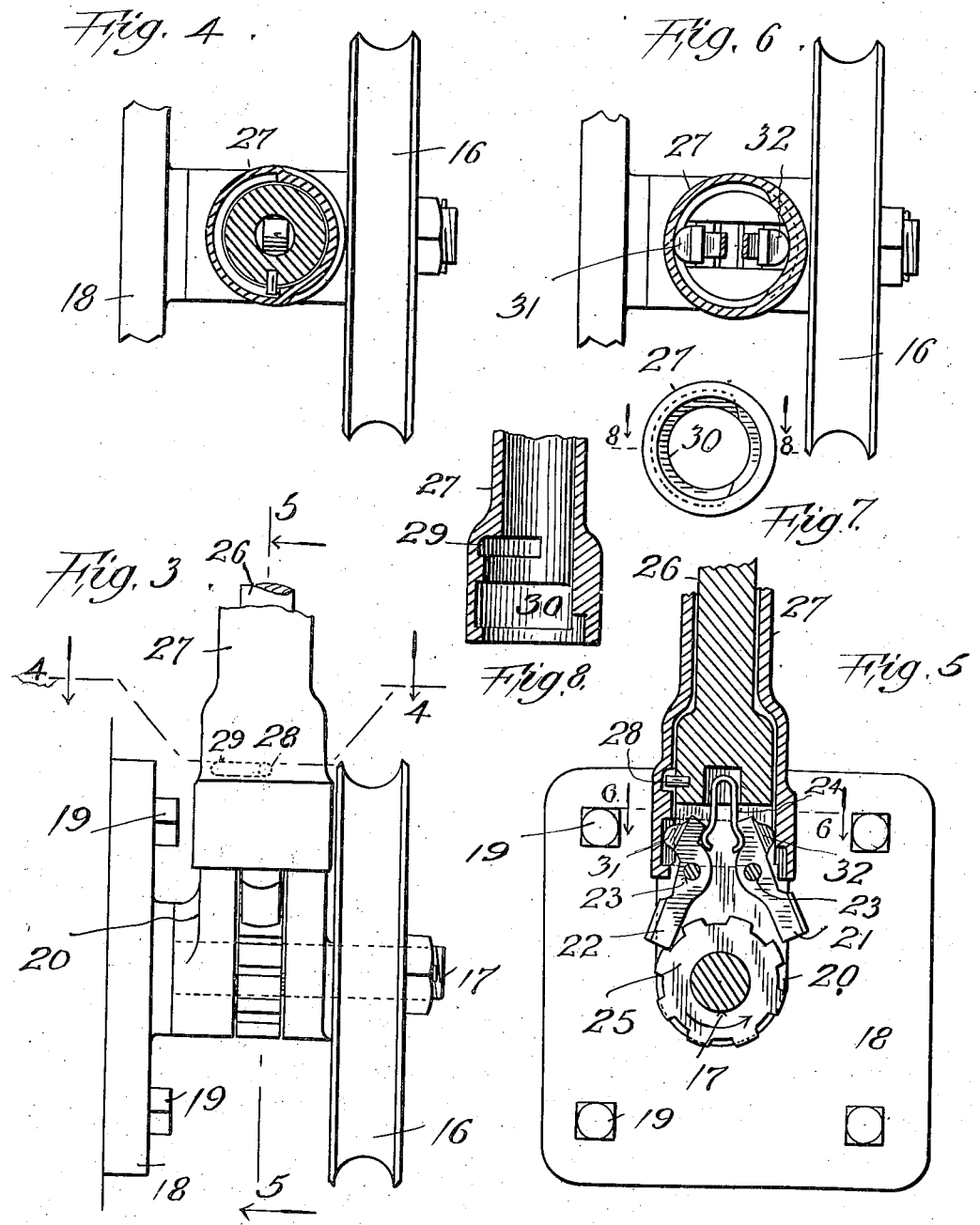

Patented Sept. 26, 1922.

1,430,349

UNITED STATES PATENT OFFICE.

WILLIAM BARBER, OF NEW YORK, N. Y.

BRAKE MECHANISM.

Application filed February 14, 1918. Serial No. 217,055.

*To all whom it may concern:*

Be it known that I, WILLIAM BARBER, a citizen of the United States, residing at New York, in the county of Kings, State of New York, have made a certain new and useful Invention in Brake Mechanism, of which the following is a specification.

This invention relates to brake mechanism and particularly to brake mechanism employed on vehicles of the tractor and trailer type.

The object of the invention is to provide a brake mechanism which is simple in structure, efficient in operation, economical of manufacture.

Further object of the invention is to provide a brake mechanism which may be readily installed on vehicles, of the tractor and trailer type now in use.

A further object is to provide a brake mechanism of the character described which affords brake control from a common point for any number of trailers coupled together and wherein the braking action is applied to each individual trailer from the common control.

Further objects of the invention will appear more fully hereinafter.

The invention consists substantially in the construction, combination, location and relative arrangement of parts, all as will be more fully hereinafter set forth as shown by the accompanying drawing and finally pointed out in the appended claims.

Referring to the drawing:

Fig. 3 is a view in front elevation of the brake band and actuating mechanism therefor employed in accordance with my invention.

Fig. 4 is a sectional view taken on the lines 4—4, Fig. 3 and looking in the direction of the arrows.

Fig. 5 is a sectional view taken on the line 5—5, Fig. 3 and looking in the direction of the arrows.

Fig. 6 is a sectional view taken on the line 6—6, Fig. 5 and looking in the direction of the arrows.

Fig. 7 is a bottom-plan view of the sleeve shown in Fig. 8.

Fig. 8 is a sectional view taken on the line 8—8 Fig. 7 and looking in the direction of the arrows.

The same part is designated by the same reference character wherever it occurs throughout the several views.

In the art of tractor and trailers as exemplified in the motor truck tractor and trailer, it is necessary to afford braking means not only to the tractor, but also to the trailer and control the application of brakes from the point of control of the tractor.

It is among the special purposes of my present invention to provide such a brake mechanism which enables the application of brakes to the tractor and trailer from the single control point and to any number of trailers that may be attached in tandem relation to each other so that when the brakes are applied on one trailer they will be simultaneously applied to all trailers. In accordance with my invention, I provide means which enables the brakes to be applied irrespective of the relative position of the tractor and trailer. For example it is the custom to couple the tractor and trailer in a pivotal connection and in accordance with my invention, the brakes may be applied to the trailer even though the trailer is disposed in an angular position relative to its normal straight line connection with the tractor and likewise to all trailers which may be connected in tandem whether or not the trailers are in a straight line alignment relative to each other.

I also provide means for locking the brakes in their applied position. The construction of the braking mechanism contemplated in accordance with my invention is such that a braking power of great strength is secured with but little expenditure of energy by the operator as will be more clearly understood from the following description.

Figure 1:
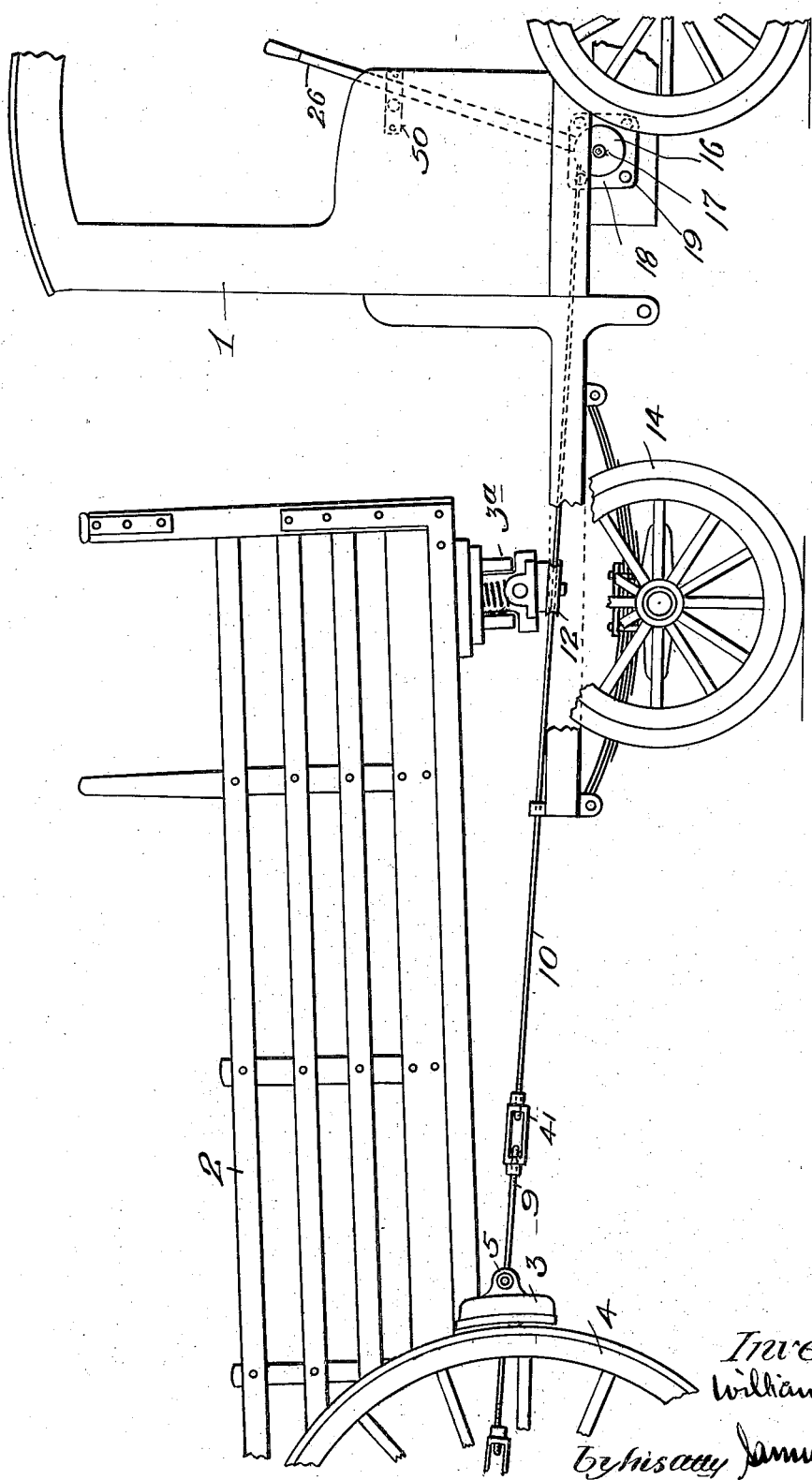
Fig. 1 is a view in side elevation of a tractor and trailer showing braking mechanism embodying my invention.

Referring to the drawing, I show at 1 a tractor which, for the purpose of illustration, but to which I do not desire to be limited or restricted, is in the form of a motor truck with a trailer 2 pivotally connected thereto in any suitable manner, for example, by the usual king pin and plate mechanism indicated generally at 3ª. While I do not desire to be limited to any particular form of construction of coupling mechanism employed, in accordance with my invention, a coupling mechanism such as shown and described in my co-pending application, Serial Number 115,243, filed August 16th, 1916, may be readily employed for this purpose. While I do not desire to be limited to any particular type or form of brakes employed as my present invention is directed to the manner of applying the brakes and the control thereof, I have shown, for the purpose of illustration, brake shoes 3 which are adapted to engage the wheels 4 of the trailer 2. The brake shoes 3 are carried at the ends of levers 5 which are pivotally mounted on brackets 6 secured to the under surface of the vehicle as shown best in Fig. 2. The inner ends of the levers 5 operate in the slot formed between the brackets 7 and the body of the vehicles to which the brackets are applied, and are pivotally connected by links 8 to the brake rod 9 as shown. Thus it will be seen that if the brake rod 9 is pulled towards the right in the view shown in Fig. 2 the brake shoes 3 will be applied to the wheels 4 and when the brake rod 9 is moved toward the left, the shoes 3 will be moved away from and out of contact with the wheels 4. The brake rod 9 is secured in any suitable detachable and adjustable manner to a similar rod 10, for example, by means of turnbuckle 11. The rod 10 may be of any suitable or desired character, but for the purpose of my present invention I prefer to have the same of heavy cable with a certain degree of flexibility. The band or cable 10 passes between two pulleys 12 located beneath the coupling mechanism 3ª as shown best in Fig. 1 and is then connected to the beam 13, which controls in the ordinary and well known manner the brakes or brake bands of the wheels 14 of the tractor. The beam 13 is connected by cable 15 to a pulley 16 mounted on a shaft 17, journaled in a bracket 18 which is suitably secured to the vehicle body by means of bolts or the like 19. The shaft 17 has mounted thereon, for rotation thereabout, a casing 20, which casing has mounted therein ratchets 21 and 22 respectively as shown in Fig. 5. These ratchets 21 and 22 are pivotally mounted in the casing 20 by means of pins 23 located at their approximate centers. A spring 24 interposed between the top ends of the ratchets 21 and 22 normally tends to cause the lower ends of the ratchets to move towards the center of the casing or towards the shaft 17. Mounted on the shaft 17 is a cog 25, the teeth of which are in alignment with the ends of the ratchets 21 and 22. The casing 20 has formed integral therewith or suitably secured thereto a lever 26, which extends upwardly into the form of a handle, such as is usually employed for brake control mechanism, and as illustrated in Fig. 1. Loosely mounted on the lever 26 is a sleeve 27 of substantially the same shape and which also extends upwardly into the form of the handle shown in Fig. 1. The sleeve 27 is held in position on the lever 26 by means of a pin 28 located in said lever 26 which operates in a groove 29 formed in the interior wall of the sleeve 27 and which allows free rotative movement of the sleeve 27 relative to the lever 26, but which prevents relative longitudinal movement between these members. The sleeve 27 is provided with an eccentric bore indicated at 30, that is, a groove 30 is bored into the sleeve 27 by means of offcentering the cutting tool when the same is made. The upper ends of the ratchets 21 and 22 and which are provided with extending lugs 31, 32, respectively are located within the eccentric groove 30, of the sleeve 27 so that when the sleeve 27 is rotated in one direction the ratchet 22 is forced over by means of the spring 24 into the groove 30 thus allowing the opposite end of the ratchet 22 to come into engaging relation with the cog 25 and at the same time the projection 32 of the ratchet 21 is forced inwardly by the inner surface of the sleeve 27 against the action of the spring 24 to disengage the opposite end of the ratchet 21 from all possible connection with the cog 25.

As above stated the sleeve 27, lever 26 and casing 20 are rotatively mounted on the shaft 17 while cog 25 is connected to the shaft 17 to be rotated therewith. Thus it will be seen that if the lever 26 and sleeve 27 are rotated say, counter-clockwise from the position shown in Fig. 5 the ratchet 22 bearing against the teeth of the cog 25 will rotate the cog and the shaft 17 counter-clockwise as indicated by the arrow in that figure. When it has been rotated as far as the stroke of the lever 26 will allow, the lever 26 is returned to its normal position, the end of the ratchet 22 moving freely over the ends of the teeth of the cog against the action of the spring 24 as will be readily understood and a repetition of the above action, which might be compared with the operation of a pump handle, continues the rotation of the shaft 17 counter-clockwise which in turn rotates the pulley 16 and effects the winding up of the brake cable 15 thereon thus applying the brakes. It will be observed that the ratchet 22 prevents the brakes from constantly loosening or giving way to the tension secured in the brake rod and cables. If it is desired to unloosen the brakes the sleeve 27 is rotated so that the ratchet 22 is released from engagement with the teeth of the cog 25 and the tension of the cable causes the shaft 17 to rotate, thereby releasing the brakes. It will be understood that the rotation of the cog and the shaft 17 may be as rapid as desired and it may be as far as desired according to the limit of the stroke of the lever 26.

If desired, and as indicated in Figure 1, the bracket 50 may be supplied to lock the lever 26 in position when the brakes have been applied or to retain the same in a constant position when the brakes are loosened and the vehicle running. It will also be understood by reference to Fig. 2 that an additional cable 40 may be attached in any suitable, adjustable or detachable means, such as shown for example, by turnbuckle 41, to the rod 9, which rod or cable 40 is then connected to the next trailer of the tandem in a manner similar to that described by the foregoing.

Figure 2:
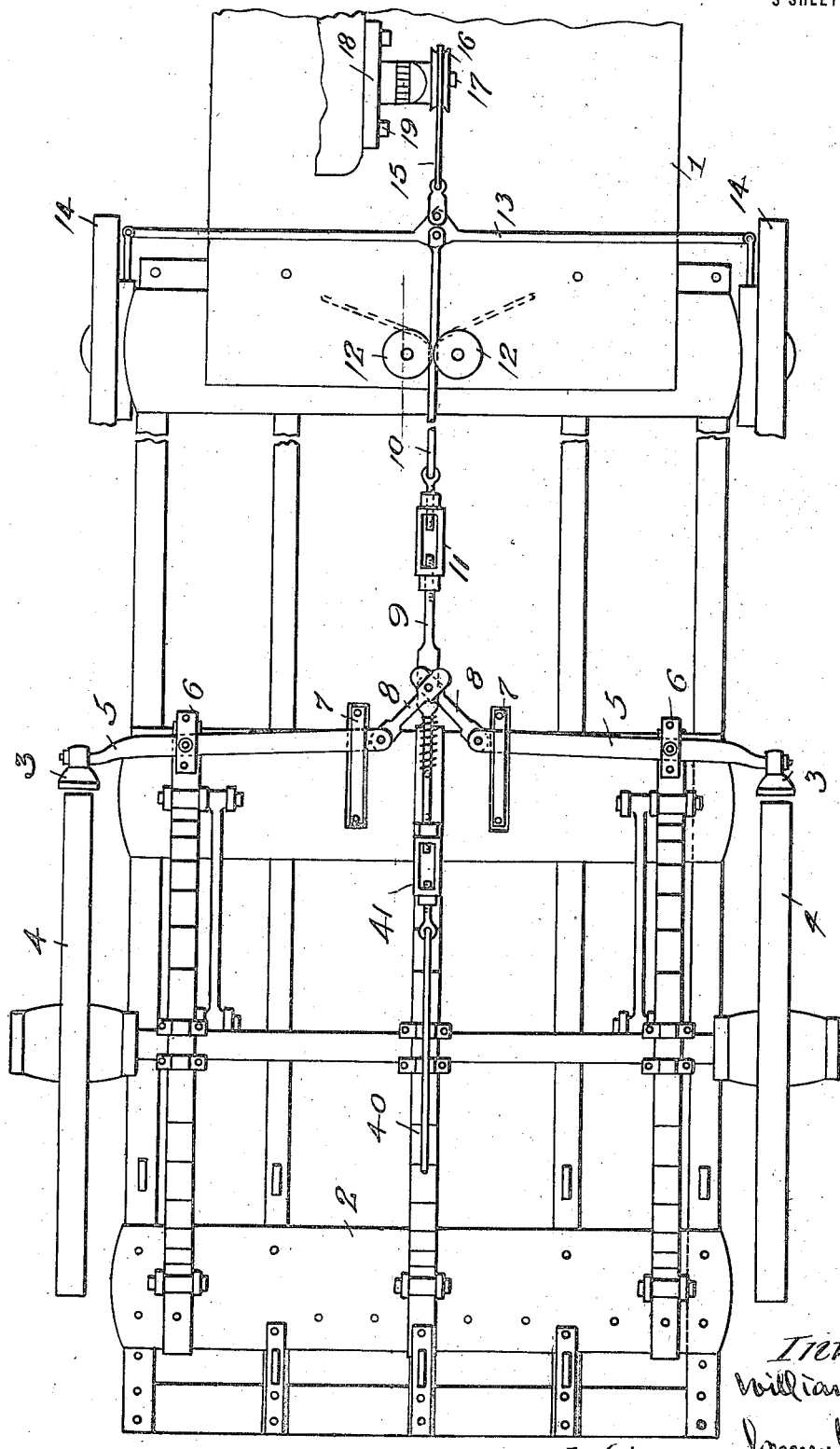
Fig. 2 is a bottom-plan view of the same.

It will also be observed, due to the flexibility of the cable 10 and its relation with the pulleys 12, that the cable 10 may be disposed at any angle relative to the pulleys 12 as indicated by dotted lines in Fig. 2 within the limits of the movement of the trailer relative to the tractor as determined by the type of coupling mechanism 3ᵃ employed. From the foregoing it is seen that I have provided a brake mechanism for use in connection with tractors and trailers wherein the brakes may be applied simultaneously to all trailers with but little energy and irrespective of the angular relation of the respective trailers to each other or to the tractor.

While I have shown and described a specific embodiment of my invention, I wish it to be understood that I am not to be limited or restricted to the specific details or construction thereof as many changes will readily occur to those skilled in the art without departing from the broad spirit and scope of my invention as defined by the claims.

Therefore, what I claim as new and useful and of my own invention and desire to secure by Letters Patent is:—

1. The combination with a tractor and trailer said tractor and trailer being pivotally connected together, of a brake for said tractor and a brake for said trailer, a manually operated brake control mechanism located on said tractor, connections between said brakes and said control mechanism, said connections comprising pairs of equal lever arms and inter-connecting links and means for connecting said brake control mechanism with said brakes to allow free pivotal movement between said tractor and trailer without interfering with the simultaneous application of said brakes upon the actuation of said brake control mechanism.

2. The combination with a tractor and trailer said tractor and trailer being pivotally connected together, of a brake for said tractor and a brake for said trailer, a manually operated brake control mechanism located on said tractor, connections between said brakes and said control mechanism, said connections comprising pairs of equal lever arms and inter-connecting links and a flexible connection between said brakes and said brake control mechanism to allow free pivotal movement between said tractor and trailer without interfering with the simultaneous application of said brakes upon the actuation of said brake control mechanism.

3. The combination with a tractor and trailer said tractor and trailer being pivotally connected together, of a brake for said tractor and a brake for said trailer, a manually operated brake control mechanism located on said tractor, and connections between said brakes and said control mechanism, said connections comprising lever arms in pairs of substantially equal length and connecting links for simultaneously applying said brakes, and means for locking said brakes in their applied position.

4. The combination with a tractor and trailer said tractor and trailer being pivotally connected together, of a drum mounted on said tractor, brakes for said tractor and trailer, connections between said brakes and said drum, said connections comprising co-ordinate pairs of lever arms of similar length and inter-connecting links whereby when said drum is rotated, said brakes are simultaneously applied to tractor or trailer, and means for rotating said drum.

5. The combination with a tractor and trailer said tractor and trailer being pivotally connected together, of a drum mounted on said tractor, brakes for said tractor and trailer, connections between said brakes and said drum, said connections comprising co-ordinate pairs of lever arms of similar length and inter-connecting links whereby when said drum is rotated, said brakes are simultaneously applied to tractor or trailer, a manually operated handle associated with said drum, and means actuated by the reciprocal operation of said handle for rotating said drum.

6. In a brake mechanism, a tractor and a trailer pivotally connected together, in combination with a drum mounted on the tractor, brakes for both tractor and trailer, connections between said brakes and said drum, said connections comprising pairs of lever arms of substantially equal length and inter-connecting links whereby said brakes are applied when said drum is rotated in one direction, and said brakes are released when said drum is rotated in the other direction, of means for rotating said drum comprising a gear secured to the shaft of said drum, a lever pivotally mounted on the shaft of said drum, and means carried by said lever for engaging said gear.

7. In a brake mechanism, and in combination with a drum, brakes, connections between said brakes and said drum, said connections comprising pairs of lever arms of substantially equal length and inter-connecting links whereby said brakes are applied when said drum is rotated in one direction, and said brakes are released when said drum is rotated in the other direction, of means for rotating said drum comprising a gear secured to the shaft of said drum, a lever pivotally mounted on the shaft of said drum, a pair of oppositely disposed pawls adapted to engage said gear in opposite directions, and means for automatically placing one of said pawls in engaging relation with said gear and for locking the other of said pawls out of engaging relation with said gear.

8. In a brake mechanism, and in combination with a drum, brakes, a connection between said brakes and said drum whereby said brakes are applied when said drum is rotated in one direction, and said brakes are released when said drum is rotated in the other direction, of means for rotating said drum comprising a gear secured to the shaft of said drum, a lever pivotally mounted on the shaft of said drum, a pair of oppositely disposed pawls adapted to engage said gear in opposite directions, a rotatable sleeve carried by said lever and provided with an eccentric groove in the interior wall thereof to engage the free ends of said pawls, substantially as shown and described.

9. The combination with a tractor and a plurality of trailers, one of said trailers having swivel connection to the tractor, of a brake mechanism for said tractor and said trailers, said brake mechanism comprising a rotary brake drum and operative means for at will moving said drum in opposite directions, and locking the same together, with brake devices for frictionally engaging and causing brake action and operative means including pairs of lever arms of substantially equal length pivotally supported and operated by means of flexible connections supported at substantially right angles to said lever arms at points substantially an equal distance from the brake shoe, and adapted to be operated by said brake drum.

In testimony whereof I have hereunto set my hand on this 13th day of February, A. D. 1918.

WILLIAM BARBER.